United States Patent
Larrain et al.

(10) Patent No.: US 7,931,992 B2
(45) Date of Patent: Apr. 26, 2011

(54) FUEL CELL SYSTEM

(75) Inventors: Diego Larrain, Berlin (DE); Matthias Bronold, Berlin (DE)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 443 days.

(21) Appl. No.: 11/730,878

(22) Filed: Apr. 4, 2007

(65) Prior Publication Data

US 2007/0238003 A1    Oct. 11, 2007

(30) Foreign Application Priority Data

Apr. 6, 2006  (EP) ................................ 06112289
Jan. 22, 2007  (KR) ..................... 10-2007-0006678

(51) Int. Cl.
*H01M 8/04* (2006.01)
(52) U.S. Cl. ........................................ 429/414; 429/413
(58) Field of Classification Search ................ 429/26, 429/34, 414, 413; 261/76
See application file for complete search history.

(56) References Cited

U.S. PATENT DOCUMENTS

| 3,775,186 | A | * | 11/1973 | Cheron | ................. | 429/410 |
| 4,634,559 | A | * | 1/1987 | Eckert | ................ | 261/76 |
| 2003/0189416 | A1 | | 10/2003 | Scholta et al. | | |
| 2004/0062964 | A1 | | 4/2004 | Matsuoka et al. | | |
| 2004/0166389 | A1 | * | 8/2004 | Matsuoka et al. | ............ | 429/26 |
| 2004/0229087 | A1 | * | 11/2004 | Senner et al. | ................. | 429/13 |
| 2005/0238932 | A1 | | 10/2005 | Koyama et al. | | |
| 2006/0081130 | A1 | * | 4/2006 | Muller et al. | ................ | 96/290 |

FOREIGN PATENT DOCUMENTS

| DE | 102004049623 | 4/2006 |
| EP | 1383190 | 1/2004 |
| EP | 1383191 | 1/2004 |
| WO | WO2006/037661 | 4/2006 |

* cited by examiner

*Primary Examiner* — Melvin C Mayes
*Assistant Examiner* — Colette Nguyen
(74) *Attorney, Agent, or Firm* — Robert E. Bushnell, Esq.

(57) ABSTRACT

Provided is a fuel cell system that include at least one fuel cell stack and at least one Venturi pump. The Venturi pump has a main inlet, a main outlet, and a secondary inlet. A main stream flows into the Venturi pump through the main inlet, and is mixed with a secondary stream, which flows into the Venturi pump through the secondary inlet. The fuel cell system of the present invention can include a carbon dioxide separator for separating water or fuel from exhaust outputted from the fuel cell stack, and a mixer for mixing fuel with water. In one embodiment, the Venturi pump can be installed between the carbon dioxide and the mixer. In another embodiment, the Venturi pump can be installed between the fuel cell stack and the carbon dioxide separator. In still another embodiment, the Venturi pump can be installed between the mixer and the fuel cell stack. More than one Venturi pump can be installed in the fuel cell system of the present invention.

19 Claims, 7 Drawing Sheets

FUEL CELL SYSTEM

CLAIM OF PRIORITY

This application makes reference to, incorporates the same herein, and claims all benefits accruing under 35 U.S.C. §119 from applications for FUEL CELL SYSTEM earlier filed in the European Patent Office on Apr. 6, 2006 and there duly assigned Serial No. 06 112 289.1, and for FUEL CELL SYSTEM earlier filed in the Korean Intellectual Property Office on Jan. 22, 2007 and there duly assigned Serial No. 10-2007-0006678.

BACKGROUND OF THE INVENTION

1. Field of the Invention

The present invention relates to a fuel cell system including at least one fuel cell stack and at least one Venturi pump.

2. Description of the Related Art

In a contemporary fuel cell system, concentrated fuel and pure water are mixed to a fuel mixture. For this purpose, water and fuel flow into a mixer. Fuel and water are mixed and stored in the mixer. The mixture of fuel and water flows through an outlet of the mixer to a fuel cell stack.

The structure of a fuel cell system disclosed in U.S. 20040166389 and U.S. 20040062964 is shown in FIG. 1. Direct methanol fuel cell (DMFC) stack 10 comprises cathode air inlet 11 and cathode air outlet 13. Air pump 12 supplies reaction air to a cathode of fuel cell stack 10 through cathode air inlet 11. DMFC fuel cell stack 10 is supplied with a fuel stream that includes water and methanol on an anode side, and is supplied with an oxidant stream (air or oxygen) on a cathode side.

DMFC fuel cell stack 10 directly produces electricity through electrochemical reaction. Membrane 14 of DMFC fuel cell stack 10, which is disposed between the anode side and cathode side, is permeable to water, and thus during an operation of DMFC fuel cell stack 10, water is transferred from the anode side to the cathode side due to electro-osmotic drag. Heat exchanger 50 cools exhaust outputted from cathode outlet 13 by the use of cooling air 51. The exhaust from cathode outlet 13 may include steam (water). When the steam flows through heat exchanger 50, the steam is condensed and becomes water. The water flows to water separator 60 from heat exchanger outlet 52. The water is separated in water separator 60 from other substances (or air), and is injected into main anode circuit 18. Main anode circuit 18 is a passage that is connected to the anode side of stack 10. Air exits water separator 60 through venting opening 61. Liquid outlet 62 of water separator 60 is connected to main anode circuit 18.

An anode fuel circuit, which is formed through main anode circuit 18, includes circulation pump 23 that feeds a fuel mixture to stack anode inlet 15, carbon dioxide separator 20 connected to stack anode outlet 16, and mixer 40 that mixes a concentrated fuel from tank 30 with water recovered from heat exchanger 50. The concentrated fuel is supplied to mixer 40 through fuel connection 32, and the water is supplied to mixer 40 through water connection 64. Fuel pump 31 pumps the fuel into mixer 40 from tank 30, and water recovery pump 63 causes the water to flow into mixer 40. Carbon dioxide separator 20 includes carbon dioxide separator gas outlet 21 and liquid outlet 22. Carbon dioxide separator 20 separates liquid from the exhaust outputted from anode outlet 16. The liquid may include fuel or water.

A device combining the functions of a carbon dioxide separator, a water separator, a mixer, and a tank is described in EP 1 383 190 A1 and EP 1 383 191 A1. The structure of the device is shown in FIG. 2. Inlet for a stream of water/air 101 is located on the top part of the device. Water 106 is separated from air by gravity, and falls to the bottom of the device. Inlet stream of fuel 102 is located at the bottom of the device which works as a liquid hold-up tank. In the liquid hold-up tank, fuel and water are mixed. The gas from the incoming stream exits the device through outlet vent 104 which has a membrane that blocks penetration of liquid but allows penetration of gas. Liquid mixture exits the device through outlet 103 and flows to a fuel cell stack.

Regarding the combination of the function of the mixer and the tank, the problem is that the proper operation of the device depends on the orientation of the device. Therefore, if the device is used in a portable system, the portable system should be stayed in one position or in a fixed orientation. The device disclosed in EP 1 383 190 A1 and EP 1 383 191 A1 works only in an upright position, and does not properly work in a tilted position. Otherwise, the device would require additional safety installations protecting the device against dysfunction. Another problem is that the device has a significantly large volume and large height, because the device is a combination of the carbon dioxide separator, the water separator, the mixer, and the tank. The large volume of the device make it difficult to integrate the DMFC system in a laptop docking station or in a battery-like system.

Additionally, a pump feeding a fluid into a main circuit is necessary, but is not suitable because the use of the pump increases the complexity, volume, and weight of the system, while degrading the system efficiency due to the requirement of additional energy for the operation of the pump.

SUMMARY OF THE INVENTION

The present invention provides an orientation independent fuel cell system having small volume and low weight.

According to an aspect of the present invention, there is provided fuel cell system including a fuel cell stack for producing electricity, a carbon dioxide separator coupled to the fuel cell stack, and a Venturi pump coupled to each of the fuel cell stack and the carbon dioxide separator. The carbon dioxide separator separates water or fuel from exhaust outputted from the fuel cell stack. The Venturi pump includes a main inlet being supplied with a main stream, a secondary inlet being supplied with a secondary stream, and a main outlet connected to each of the main inlet and the secondary inlet. The main stream is mixed with the secondary stream in the Venturi pump.

The carbon dioxide separator can be coupled between the fuel cell stack and the main inlet of the Venturi pump. The water or the fuel separated in the carbon dioxide separator is injected into the main inlet of the Venturi pump. The carbon dioxide separator also can be coupled to the main outlet of the Venturi pump, and the main inlet of the Venturi pump can be coupled to the fuel cell stack. Water or fuel outputted from the fuel cell stack is injected into the main inlet of the Venturi pump.

The fuel cell system may further include a mixer coupled to the fuel cell stack and mixing fuel with water. The main inlet of the Venturi pump can be coupled to the fuel cell stack, and the main outlet of the Venturi pump can be coupled to the mixer. Water or fuel outputted from the fuel cell stack is injected into the main inlet of the Venturi pump. The main inlet of the venturi pump can be coupled to the mixer, and the outlet of the Venturi pump can be coupled to the fuel cell stack. Water or fuel outputted from the mixer is injected into the main inlet of the Venturi pump.

The fuel cell system may further include a carrier device couple to the fuel cell stack. The Venturi pump can be integrated into the carrier device. The carrier device can be the carbon dioxide separator, a water separator for separating water from exhaust outputted from the fuel cell stack, a mixer for mixing fuel with water, or combinations thereof. The carrier device may include a wall including the Venturi pump, and a cover covering the Venturi pump integrated in the wall.

The Venturi pump may further include a tube constriction at which the main inlet, the main outlet, and the secondary inlet are coupled together. The main stream flows through a cross-section of the tube constriction, and an area of the cross-section of the tube constriction is equal to or greater than $2 \times 10^{-7}$ m$^2$.

The fuel cell system may further include a no-return device coupled to the secondary inlet of the Venturi pump. The no-return device allows flow of the secondary stream in a direction, and prevents flow of the secondary stream in an opposite direction.

According to another aspect of the present invention, there is provided fuel cell system including a fuel cell stack for producing electricity, a mixer coupled to the fuel cell stack and mixing fuel with water, a Venturi pump coupled to each of the fuel cell stack and the mixer.

According to still another aspect of the present invention, there is provided fuel cell system including a fuel cell stack for producing electricity, a carbon dioxide separator coupled to the fuel cell stack, a mixer coupled to the fuel cell stack and mixing fuel with water, and a Venturi pump coupled to each of the carbon dioxide separator and the mixer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention will be described more fully with reference to the accompanying drawings, in which exemplary embodiments of the invention are shown.

Figure 3:
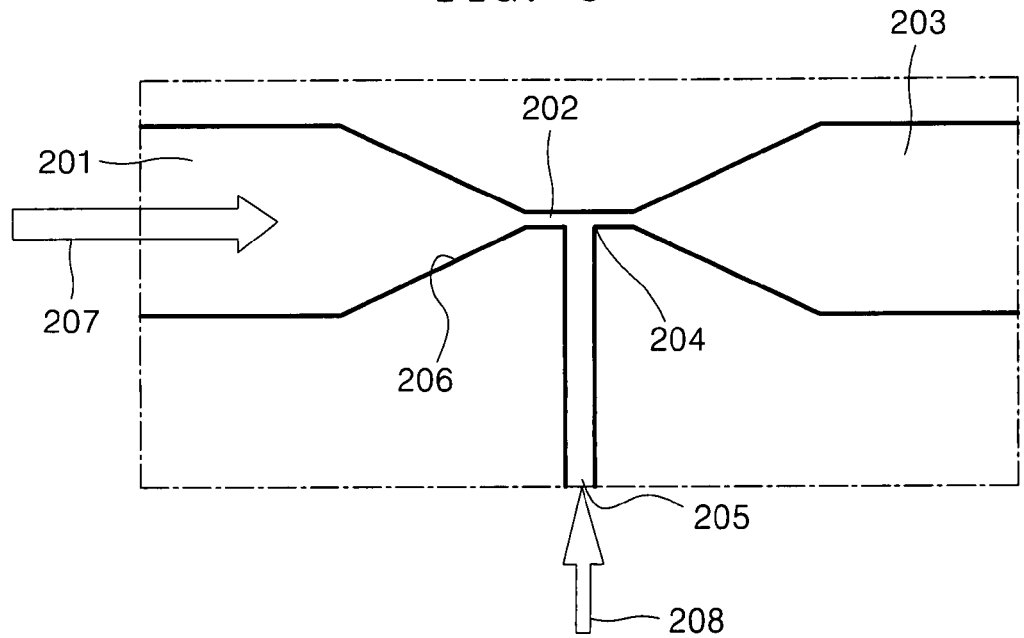
FIG. 3 illustrates a Venturi pump installed in a fuel cell system constructed as an embodiment of the present invention.

FIG. 3 illustrates a Venturi pump including main inlet 201, main outlet 203, secondary inlet 205, section contraction 206, tube constriction 202, and connection 204. Main stream 207 enters the Venturi pump through main inlet 201. Secondary stream 208 is injected through secondary inlet 205 into the Venturi pump. Main stream 207 meets secondary stream 208 at connection 204. Secondary stream 208 is mixed with main stream 207 in tube constriction 202. The mixture of main stream 207 and secondary stream 208 exits the Venturi pump through main outlet 203.

In the Venturi pump, main stream 207 is locally accelerated at tube constriction 202 due to the Bernoulli's principle. The acceleration of main stream at tube constriction 202 causes static pressure of main stream 207 to decrease. Thus, the static pressure in secondary inlet 205, which is connected to tube constriction 202 of the Venturi pump, is higher than the static pressure in tube constriction 202 of the Venturi pump. The higher static pressure in secondary inlet 205 causes secondary stream 208 in secondary inlet 205 to be dragged into tube constriction 202 of the Venturi pump. Main stream 207 is mixed with secondary stream 208 at tube constriction 202. Main stream 207 and secondary stream 208 are combined, and exit the Venturi pump through main outlet 203.

The diameters of main inlet 201 and main outlet 203 are larger than the diameter of tube constriction 202 to drag a large volume of secondary stream 208. Main stream 207, which is mixed with secondary stream 208 at tube constriction 202, moves from main inlet 201 to main outlet 203. In this case, a cross-section of tube constriction 202 is defined as a surface through which main stream 207 flows. Therefore, the surface of the cross-section of tube constriction 202 is substantially perpendicular to the flow direction of main stream 207 in tube constriction 202. In order to increase the efficiency of the venturi pump, the area of the cross-section of tube constriction 204 can be equal or greater than $2 \times 10^{-7}$ m$^2$.

Figure 1:
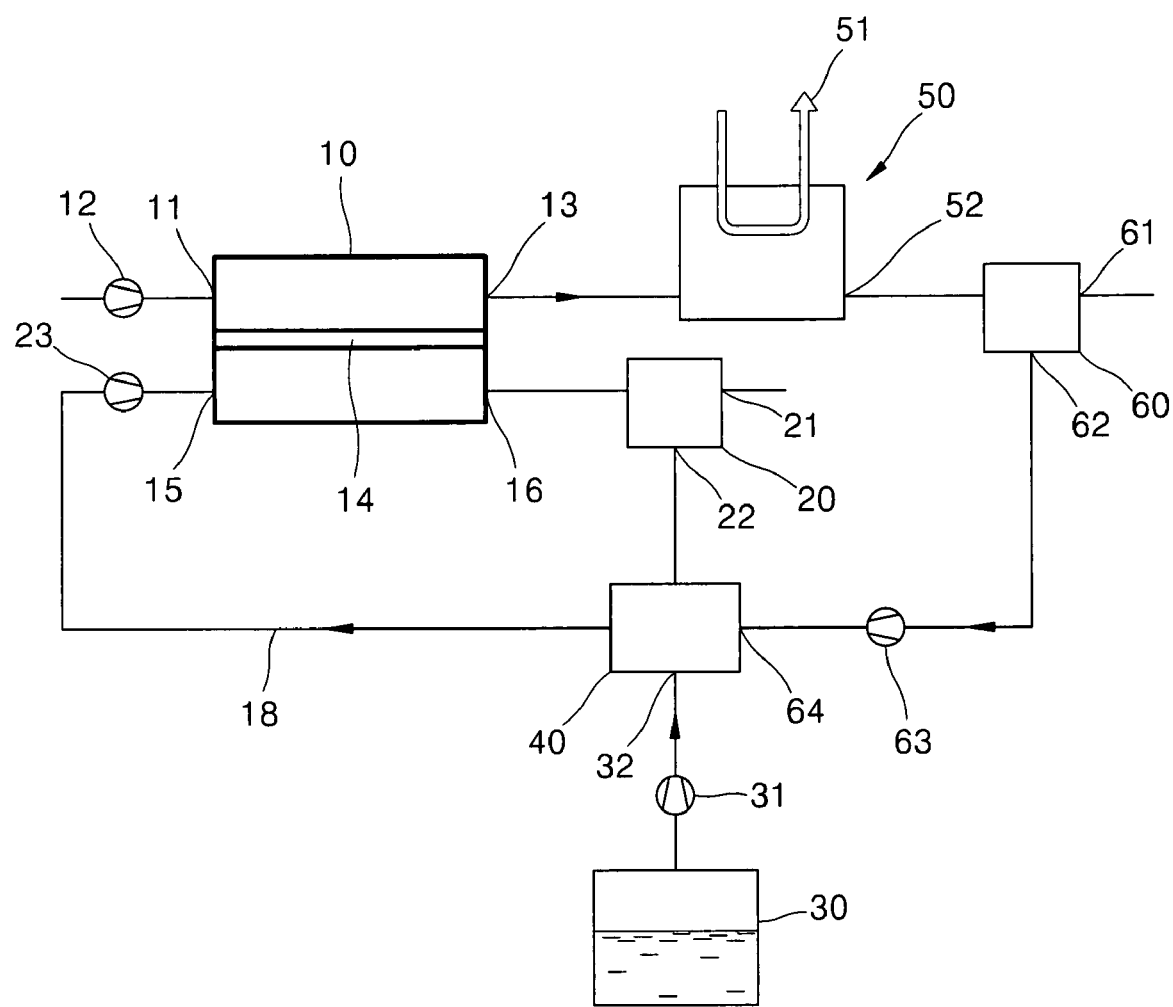
FIG. 1 illustrates a structure a contemporary direct methanol fuel cell (DMFC) system.
Figure 2:
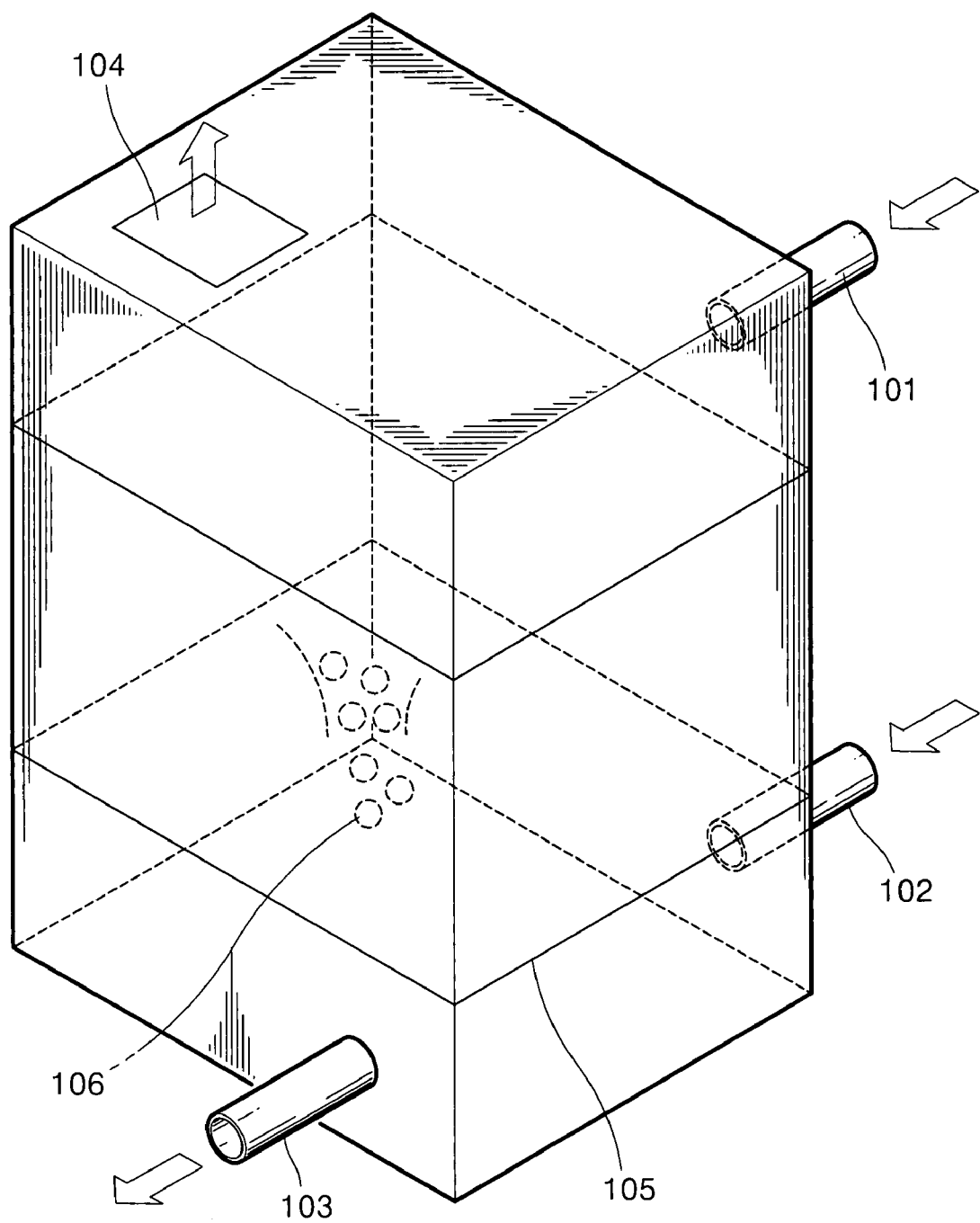
FIG. 2 illustrates a contemporary device that includes a carbon dioxide separator, a water separator, a mixer, and a tank.
Figure 4:
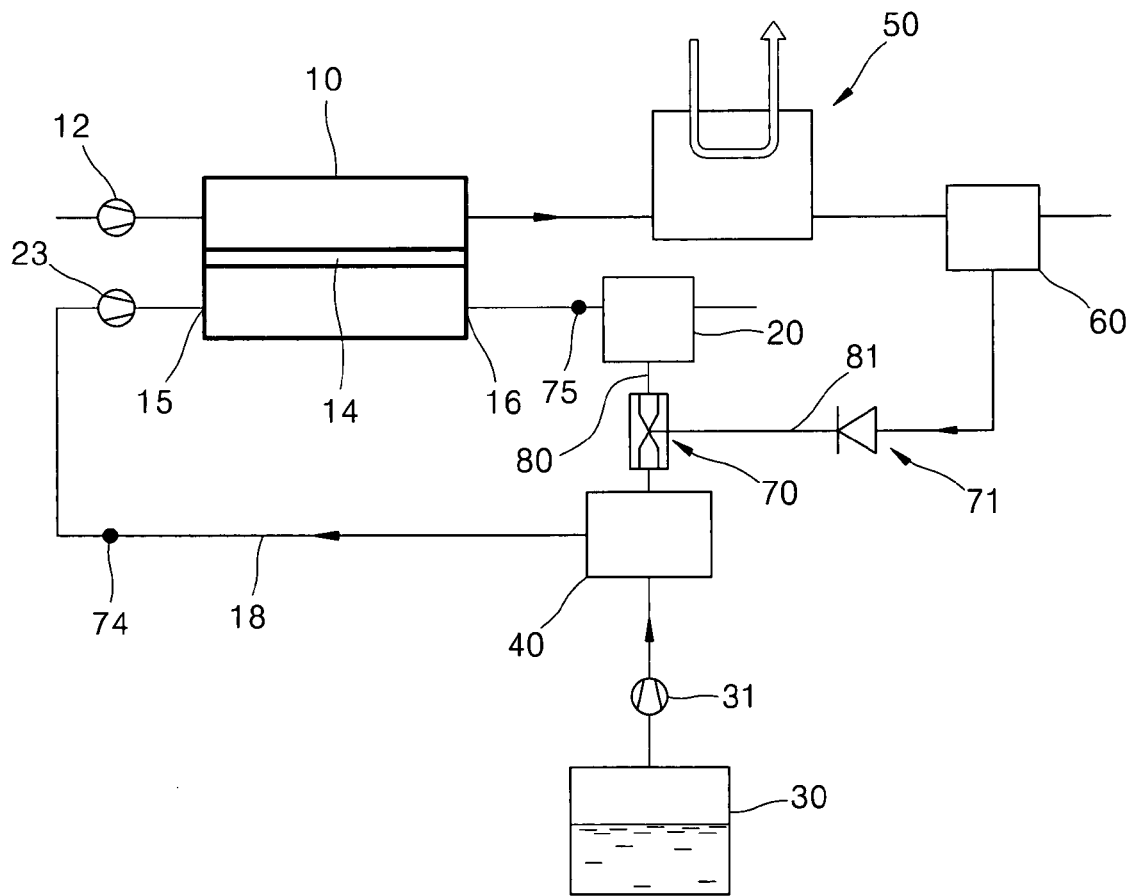
FIG. 4 illustrates a DMFC system with one Venturi pump, which is constructed as an embodiment of the present invention.

The basic structure of the present invention is illustrated in FIG. 4. The description of the same elements of the present embodiment as those illustrated in FIG. 1 will not be repeated. A direct methanol fuel cell (DMFC) system of the present invention includes at least one main fluid conduit 80 and at least one secondary fluid conduit 81, each of which is coupled to fuel cell stack 10. In other words, main fluid conduit 80 and secondary fluid conduit 81 are directly or indirectly connected to fuel cell stack 10.

In an embodiment of the present invention, Venturi pump 70 is coupled between carbon dioxide separator 20 and mixer 40. In this case, it can be also described that Venturi pump 70 is placed between carbon dioxide separator 20 and mixer 40. The meaning of "being placed between" or "being coupled between" is that one end of Venturi pump 70 is connected to carbon dioxide separator 20, and another end of Venturi pump 70 is connected to mixer 40. In this case, it is not necessary that Venturi pump 70 should be physically located between carbon dioxide separator 20 and mixer 40. Therefore, even though Venturi pump 70 is not physically located between carbon dioxide separator 20 and mixer 40, Venturi pump 70 can be coupled between carbon dioxide separator 20 and mixer 40. Moreover, the meaning of "being coupled to" or "being connected to" is that one element is directly or indirectly coupled or connected to another element.

Main fluid conduit 80 and secondary fluid conduit 81 are connected to each other via Venturi pump 70. Venturi pump 70 is integrated in the DMFC system, and injects water or fuel into main anode circuit 18. In one embodiment, Venturi pump 70 is placed between carbon dioxide separator 20 and mixer 40. No-return pump 71 is installed in secondary fluid conduit 81 to make fluid stream, which flows from water separator 60 to Venturi pump 70, flow in one direction and to prevent the fluid stream from flowing in an opposite direction.

In an alternative embodiment, Venturi pump 70 may be coupled between mixer 40 and stack anode inlet 15, or at any other position within main anode circuit 18, e.g., at first position 74 and/or at second position 75.

Figure 5:
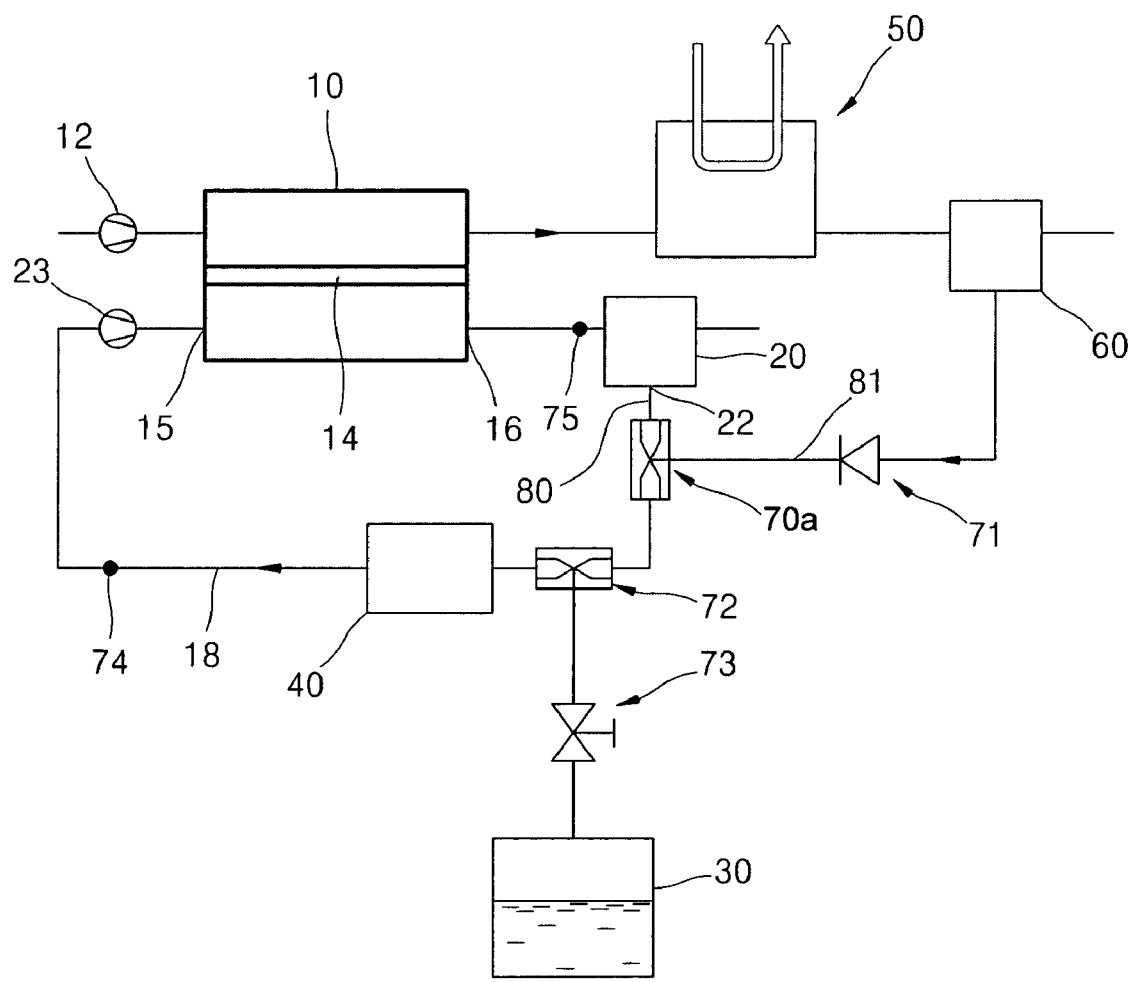
FIG. 5 illustrates a DMFC system with two Venturi pumps, which is constructed as another embodiment of the present invention.

FIG. 5 illustrates a DMFC system with first Venturi pump 70a and second Venturi pump 72, which is constructed as another embodiment of the present invention. First Venturi pump 70a is coupled between carbon dioxide separator 20 and mixer 40, and second Venturi pump 72 is coupled between first Venturi pump 70a and mixer 40. Second Venturi pump 72 injects concentrated fuel from tank 30 into main anode circuit 18. Regulation valve 73 is placed between tank 30 and second Venturi pump 72. This structure of the present embodiment allows a removal of an electrically driven fuel pump, and thus simplifies the DMFC system.

Figure 6:
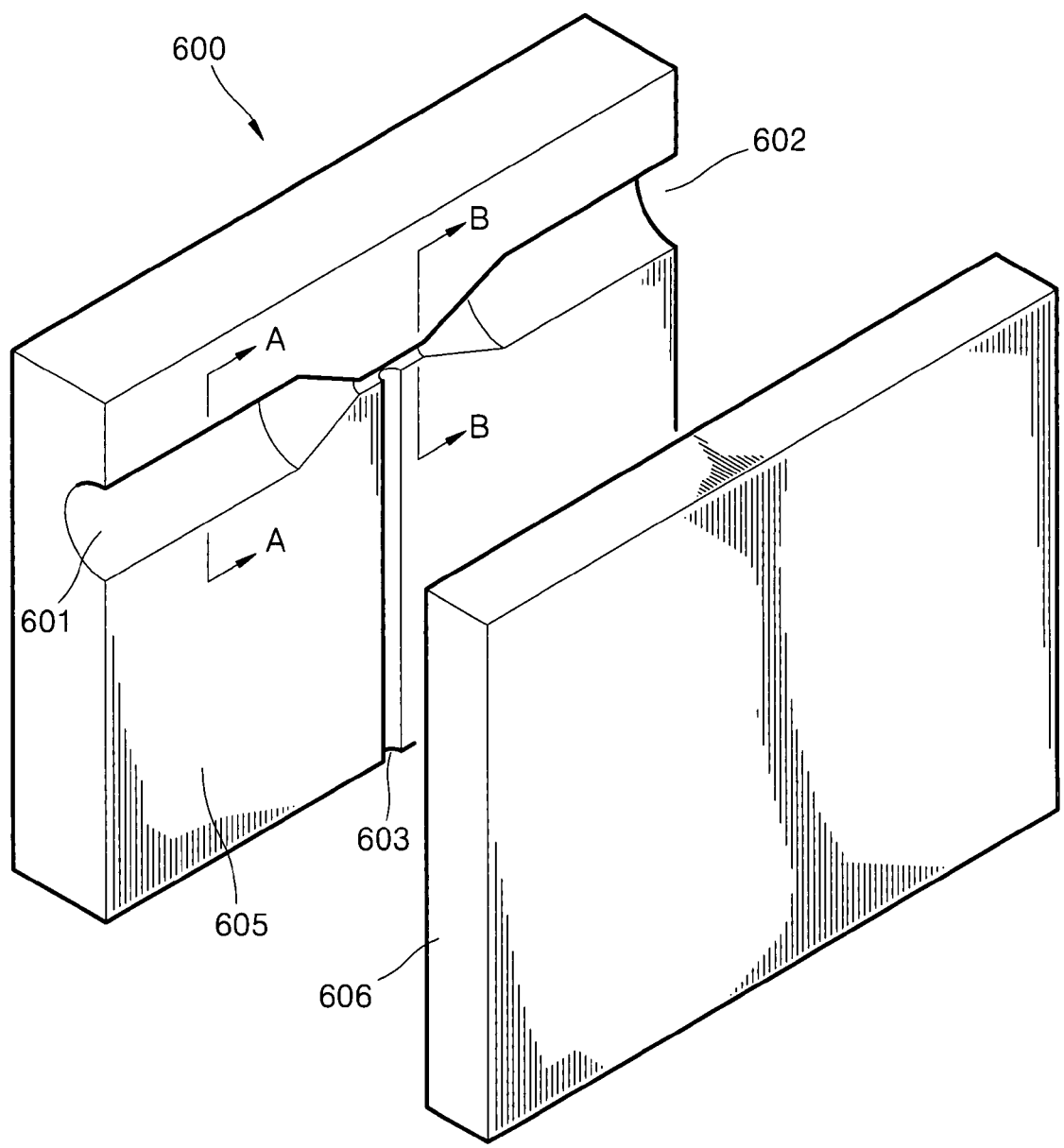
FIG. 6 illustrates a Venturi pump integrated into a wall of a carrier device constructed as an embodiment of the present invention.

FIG. 6 illustrates a Venturi pump integrated into wall 605 of carrier device 600, which is constructed as another embodiment of the present invention. The Venturi pump is covered by cover 606. Carrier device 600 can be any other device integrated in the DMFC system. Carrier device 600 can be a device such as carbon dioxide separator 20, water separator 60, mixer 40, or combinations thereof. Main Venturi fluid inlet 602, main Venturi fluid outlet 601, and secondary inlet 603 are formed in wall 605 of carrier device 600. Main Venturi fluid inlet 602 or main Venturi fluid outlet 601 is connected to other device, such as mixer 40, through internal passage of carrier device 600.

Figure 7:
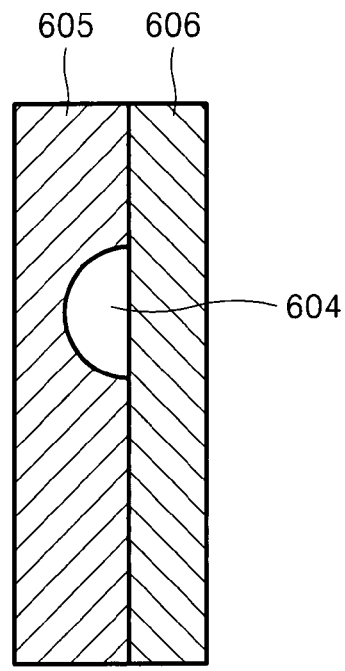
FIG. 7 is a cross-sectional view taken along the line A-A of the Venturi pump of the carrier device shown in FIG. 6.
Figure 8:
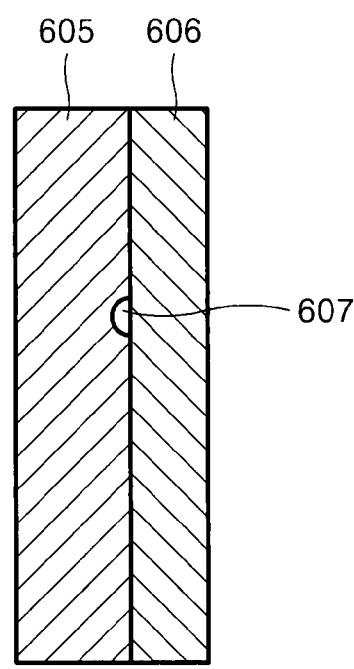
FIG. 8 is a cross-sectional view taken along the line B-B of the Venturi pump of the carrier device shown in FIG. 6.

FIG. 7 is a cross-sectional view taken along the line A-A of the Venturi pump illustrated in FIG. 6. Fluid section 604 is formed in wall 605 of carrier device 600, and covered by cover 606. FIG. 8 shows a cross-sectional view taken along the line B-B of the Venturi pump illustrated in FIG. 6. Channel constriction section 607 is formed between wall 605 of carrier device 600 and cover 606.

Figure 9:
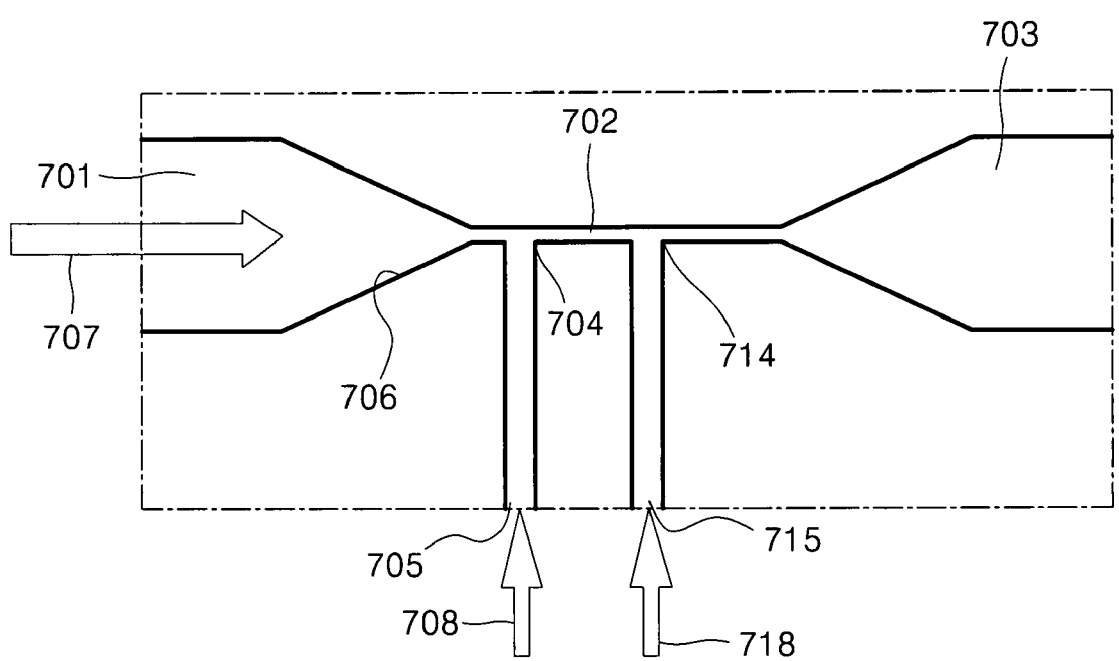
FIG. 9 illustrates a Venturi pump with two secondary inlets that is integrated into the DMFC system of an embodiment of the present invention.

FIG. 9 illustrates a Venturi pump including main inlet 701, main outlet 703, first secondary inlet 705, second secondary inlet 715, section contraction 706, and tube constriction 702, which is constructed as an embodiment of the present invention. First and second secondary inlets 705 and 715 (e.g., one for water and another for concentrated fuel) are arranged on the same tube constriction 702. That is, one tube constriction 702 includes first secondary junction 704 and second secondary junction 714 for first and second secondary inlets 705 and 715, respectively.

Main stream 707 enters the Venturi pump via main inlet 701. First secondary stream 708 and second secondary stream 718 are injected into main stream 707 of the Venturi pump through first and second secondary inlets 705 and 715, respectively.

As shown through the embodiments of the present invention, the fuel cell system of the present invention does not depend on the orientation of the system. The fuel cell system of the present invention can be made compact and lightweight. The fuel cell system of the present invention is orientation independent due to the use of the Venturi pump, because the effect of gravity does not contribute to the mixing in the Venturi pump. Additionally, no extra pump to feed a secondary stream into a main stream is necessary. A further advantage is that the main stream and the secondary stream are combined within the Venturi pump. In other word, an additional mixer is not required, or if a mixer is necessary, the mixer integrated in the fuel cell system of the present invention can have smaller volume and capacity.

While the present invention has been particularly shown and described with reference to exemplary embodiments thereof, it will be understood by those of ordinary skill in the art that various changes in form and details maybe made therein without departing from the spirit and scope of the present invention as defined by the following claims.

What is claimed is:

1. A fuel cell system, comprising:
a fuel cell stack for producing electricity, the fuel cell stack comprising an anode outlet outputting an exhaust and a cathode outlet outputting another exhaust; and
a Venturi pump coupled to the fuel cell stack, the Venturi pump comprising:
a main inlet coupled to the fuel cell stack and being supplied with a water or a fuel from the exhaust outputted from the anode outlet of the fuel cell stack;
a secondary inlet coupled to the fuel cell stack and being supplied with a water from the another exhaust outputted from the cathode outlet of the fuel cell stack, the water or the fuel from the exhaust outputted from the anode outlet being mixed with the water from the another exhaust outputted from the cathode outlet in the Venturi pump; and
a main outlet connected to each of the main inlet and the secondary inlet.

2. The fuel cell system of claim 1, further comprising:
a carbon dioxide separator coupled between the anode outlet of the fuel cell stack and the main inlet of the Venturi pump; the carbon dioxide separator separating the water or the fuel from the exhaust outputted from the anode outlet of the fuel cell stack; the water or the fuel separated in the carbon dioxide separator being injected into the main inlet of the Venturi pump.

3. The fuel cell system of claim 1, further comprising:
a carbon dioxide separator coupled to the main outlet of the Venturi pump;
the main inlet of the Venturi pump being coupled to the fuel cell stack; and
water or fuel outputted from the fuel cell stack being injected into the main inlet of the Venturi pump.

4. The fuel cell system of claim 1, further comprising:
a mixer coupled to the fuel cell stack and mixing fuel with water; the main outlet of the Venturi pump being coupled to the mixer; the mixture of the water or the fuel from the exhaust outputted from the anode outlet and the water from the another exhaust outputted from the cathode outlet of the Venturi pump flowing into the mixer.

5. The fuel cell system of claim 1, further comprising:
a mixer coupled to the fuel cell stack and mixing fuel with water;
the main inlet of the venturi pump being coupled to the mixer;
the outlet of the Venturi pump being coupled to the fuel cell stack; and
water or fuel from the mixer being injected into the main inlet of the Venturi pump.

6. The fuel cell system of claim 1, further comprising:
a carrier device couple to the fuel cell stack;
the Venturi pump being integrated into the carrier device;
the carrier device including one selected from the group consisting of the carbon dioxide separator, a water separator for separating water from exhaust outputted from the fuel cell stack, a mixer for mixing fuel with water, and combinations thereof.

7. The fuel cell system of claim 6, comprised of the carrier device comprising:
a wall including the Venturi pump; and
a cover covering the Venturi pump integrated in the wall.

8. The fuel cell system of claim 1, comprised of:
the Venturi pump further comprising:
a tube constriction at which the main inlet, the main outlet, and the secondary inlet are coupled together;
the water or the fuel from the exhaust outputted from the anode outlet flowing through a cross-section of the tube constriction; and
an area of the cross-section of the tube constriction being equal to or greater than $2 \times 10^{-7}$ m$^2$.

9. The fuel cell system of claim 1, further comprising:
a no-return pump coupled to the secondary inlet of the Venturi pump; the no-return pump allowing flow of the water from the another exhaust outputted from the cathode outlet towards the secondary inlet and preventing flow of the water from the another exhaust outputted from the cathode outlet out of the secondary inlet.

10. A fuel cell system, comprising:
a fuel cell stack for producing electricity, the fuel cell stack comprising an anode outlet outputting an exhaust and a cathode outlet outputting another exhaust;
a mixer coupled to the fuel cell stack and mixing fuel with water;
a Venturi pump coupled to each of the fuel cell stack and the mixer, the Venturi pump comprising:
  a main inlet coupled to the fuel cell stack, the main inlet being supplied with a water or a fuel from the exhaust outputted from the anode outlet of the fuel cell stack;
  a secondary inlet coupled to the fuel cell stack, the secondary inlet being supplied with a water from the another exhaust outputted from the cathode outlet of the fuel cell stack, the water or the fuel from the exhaust outputted from the anode outlet being mixed with the water from the another exhaust outputted from the cathode outlet in the Venturi pump; and
  a main outlet connected to each of the main inlet and the secondary inlet.

11. The fuel cell system of claim 10, further comprising:
a carbon dioxide separator coupled between the anode outlet of the fuel cell stack and the main inlet of the Venturi pump; the carbon dioxide separator separating the water or the fuel from the exhaust outputted from the anode outlet of the fuel cell stack; the water or the fuel separated in the carbon dioxide separator being injected into the main inlet of the Venturi pump.

12. The fuel cell system of claim 10, further comprising:
a carbon dioxide separator coupled to the main outlet of the Venturi pump;
the main inlet of the Venturi pump being coupled to the fuel cell stack;
water or fuel outputted from the fuel cell stack being injected into the main inlet of the Venturi pump.

13. The fuel cell system of claim 10, comprised of:
the mixer being coupled to the main outlet of the Venturi pump; the mixture of the water or the fuel from the exhaust outputted from the anode outlet and the water from the another exhaust outputted from the cathode outlet of the Venturi pump flowing into the mixer.

14. The fuel cell system of claim 10, comprised of:
the mixer coupled to the main inlet of the venturi pump;
the fuel cell stack being coupled to the outlet of the Venturi pump; and
water or fuel outputted from the mixer being injected into the main inlet of the Venturi pump.

15. The fuel cell system of claim 10, further comprising:
a carrier device couple to the fuel cell stack;
the Venturi pump being integrated into the carrier device; and
the carrier device including one selected from the group consisting of a carbon dioxide separator for separating water or fuel from exhaust outputted from the fuel cell stack, a water separator for separating water from exhaust outputted from the fuel cell stack, the mixer, and combinations thereof.

16. The fuel cell system of claim 10, comprised of the carrier device comprising:
a wall including the Venturi pump; and
a cover covering the Venturi pump integrated in the wall.

17. The fuel cell system of claim 10, comprised of the Venturi pump further comprising:
a tube constriction at which the main inlet, the main outlet, and the secondary inlet are coupled together; the water or the fuel from the exhaust outputted from the anode outlet flowing through a cross-section of the tube constriction; an area of the cross-section of the tube constriction being equal to or greater than $2 \times 10^{-7}$ m$^2$.

18. A fuel cell system comprising:
a fuel cell stack for producing electricity, the fuel cell stack comprising an anode outlet outputting an exhaust and a cathode outlet outputting another exhaust;
a carbon dioxide separator coupled to the anode outlet of the fuel cell stack, the carbon dioxide separator separating water or fuel from the exhaust outputted from the anode outlet of the fuel cell stack;
a mixer coupled to the fuel cell stack and mixing fuel with water; and
a Venturi pump coupled between the carbon dioxide separator and the mixer; the Venturi pump comprising:
  a main inlet coupled to the fuel cell stack, the main inlet being supplied with a water or a fuel from the exhaust outputted from the anode outlet of the fuel cell stack;
  a secondary inlet coupled to the fuel cell stack, the secondary inlet being supplied with a water from the another exhaust outputted from the cathode outlet of the fuel cell stack, the water or the fuel from the exhaust outputted from the anode outlet being mixed with the water from the another exhaust outputted from the cathode outlet in the Venturi pump; and
  a main outlet connected to each of the main inlet and the secondary inlet.

19. The fuel cell system of claim 18, wherein the main inlet of the Venturi pump is coupled to the carbon dioxide separator, and the main outlet of the Venturi pump is coupled to the mixer.

* * * * *